United States Patent
Lunt et al.

(10) Patent No.: US 7,110,541 B1
(45) Date of Patent: Sep. 19, 2006

(54) SYSTEMS AND METHODS FOR POLICY BASED PRINTING

(75) Inventors: Teresa F. Lunt, Palo Alto, CA (US); Matthew K. Franklin, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 956 days.

(21) Appl. No.: 09/722,508

(22) Filed: Nov. 28, 2000

(51) Int. Cl.
*H04K 1/00* (2006.01)

(52) U.S. Cl. .................. 380/51; 713/176; 358/1.14; 358/1.15; 358/3.28; 709/229; 382/100; 382/135

(58) Field of Classification Search ............ 380/51; 713/176; 382/100, 135; 358/1.14, 1.15, 358/3.28; 709/229
See application file for complete search history.

(56) References Cited

U.S. PATENT DOCUMENTS

| | | | | |
|---|---|---|---|---|
| 4,435,834 A | * | 3/1984 | Pauli et al. | 382/135 |
| 5,157,726 A | * | 10/1992 | Merkle et al. | 713/176 |
| 5,444,779 A | * | 8/1995 | Daniele | 399/366 |
| 5,564,109 A | | 10/1996 | Snyder et al. | |
| 5,629,980 A | * | 5/1997 | Stefik et al. | 705/54 |
| 5,664,018 A | | 9/1997 | Leighton | |
| 5,678,155 A | * | 10/1997 | Miyaza | 399/366 |
| 5,949,885 A | | 9/1999 | Leighton | |
| 6,141,753 A | | 10/2000 | Zhao et al. | |
| 6,233,684 B1 | * | 5/2001 | Stefik et al. | 713/176 |
| 6,237,096 B1 | * | 5/2001 | Bisbee et al. | 713/178 |
| 6,298,142 B1 | | 10/2001 | Nakano et al. | |
| 6,329,453 B1 | * | 12/2001 | Meinhardt et al. | 524/210 |
| 6,345,104 B1 | * | 2/2002 | Rhoads | 382/100 |
| 6,614,914 B1 | * | 9/2003 | Rhoads et al. | 382/100 |
| 6,763,464 B1 | * | 7/2004 | Wang et al. | 713/193 |
| 6,804,376 B1 | * | 10/2004 | Rhoads et al. | 382/100 |
| 6,823,075 B1 | * | 11/2004 | Perry | 382/100 |
| 6,970,259 B1 | * | 11/2005 | Lunt et al. | 358/1.14 |
| 6,980,668 B1 | * | 12/2005 | Naito et al. | 382/100 |

(Continued)

FOREIGN PATENT DOCUMENTS

EP        0 859 337 A        8/1998

(Continued)

OTHER PUBLICATIONS

Mintzer et al., Safeguarding Digital Library Contents and Users, Digital Watermarking, IBM Research Division, Dec. 1997.*

(Continued)

*Primary Examiner*—Taghi T. Arani
(74) *Attorney, Agent, or Firm*—Oliff & Berridge, PLC; Eugene Palazzo

(57) ABSTRACT

A print management system includes a policy that determines a protection level for a document to be printed. The document is printed using forgery detection and deterrence technologies, such as fragile and robust watermarks, glyphs, and digital signatures, that are appropriate to the level of protection determined by the policy. A plurality of printers are managed by a print management system. Each printer can provide a range of protection technologies. The policy determines the protection technologies for the document to be printed and the print management system routes the print job to a printer that can apply the appropriate protections and sets the appropriate parameters in the printer. Copy evidence that can verify that a document is a forgery and/or tracing information that identifies the custodian(s) of the document and restrictions on copying of the document and use of the information in the document are included in the watermark that is printed with the document information. A document can be verified as an original or a forgery by inspecting the copy evidence and/or tracing information in the watermark.

13 Claims, 2 Drawing Sheets

U.S. PATENT DOCUMENTS

| | | | |
|---|---|---|---|
| 2001/0046308 A1 | 11/2001 | Nakano et al. | |
| 2001/0054150 A1* | 12/2001 | Levy | 713/176 |
| 2003/0128862 A1* | 7/2003 | Decker et al. | 382/100 |
| 2004/0153649 A1* | 8/2004 | Rhoads et al. | 713/176 |

FOREIGN PATENT DOCUMENTS

| | | | |
|---|---|---|---|
| EP | 0 961 239 | * | 4/1999 |
| EP | 1 137 252 A | | 9/2001 |
| GB | 2 358 100 A | | 7/2001 |
| WO | WO 99/41900 | | 8/1999 |

OTHER PUBLICATIONS

Pititcolas et al., Information Hiding-A Survey, Proceedings of the IEEE, vol. 87, No. 7. Jul. 1999, pp. 1062-1078.*

* cited by examiner

SYSTEMS AND METHODS FOR POLICY BASED PRINTING

BACKGROUND OF THE INVENTION

1. Field of Invention

This invention relates to document forgery protection systems and methods.

2. Description of Related Art

Various techniques are known for detecting and/or deterring forgery of an original printed document. Document forgery includes both unauthorized alteration of the original document and unauthorized copying of the original document. Previously, watermarks have been applied to documents to detect and/or deter forgery. Watermarks are printed marks on a document that can be visually detected or detected using special equipment. Fragile watermarks are marks that appear in an original printed document but that will not appear in a copy of the original document made on a standard photocopier or will be detectably degraded in the resulting copy of the document.

Robust watermarks are marks in an original document that will be accurately reproduced on any copy of the original document made on an standard photocopier so that information contained in the watermark can be extracted from the copy. There are two types of robust watermarks that can be used. The first type of robust watermark is a mark that appears on both the original document and a copy. The second type of robust watermark is a mark that is present, but that is not readily visible, on the original document, but that becomes clearly visible on a copy of the original document. The second type of robust watermark is also known as an invisible robust watermark.

Forgery of an original document containing a fragile watermark by copying the original document is easily detected by the absence of the watermark on the copy of the original document. Forgery of an original document containing the first type of robust watermark is detected by extracting information contained in the robust mark. This information could identify a custodian of the original document and information relating to copy restrictions or other restrictions as to the use of the information in the original document. Forgery of an original document containing the second type of robust watermark is detected by the visible presence of the watermark on the copy of the original document. For example, the information contained in the second type of robust watermark could be a banner that reads "This is a copy" or a similar warning.

SUMMARY OF THE INVENTION

This invention provides systems and methods for adding fragile and robust watermarks to an original document as it is printed.

This invention separately provides systems and methods for printing a document requiring forgery protection using a number of trusted printers.

This invention separately provides a series of trusted printers that together permit differing levels of forgery protection to be provided to a document to be printed.

In accordance with various exemplary embodiments of the systems and methods according to this invention, a family of trusted printers is managed to provide a range of different forgery detection and deterrence techniques. The protection requirements for an original document to be printed are determined by a trusted printing policy. The factors used to determine the protection requirements required for the original document to be printed include the value of the document being created, assumptions about the resources available to an adversary or attacker, such as a potential forger, and the cost of providing the protections to the original document to be printed.

When an original document requiring forgery protection is to be printed, the print job for that document is routed to a trusted printer that can print a watermark that includes copy evidence and/or tracing information necessary to obtain the required level of protection. Copy evidence is evidence that can be obtained through an inspection of a document that indicates whether that particular document is an unauthorized copy of an original document. Tracing information is information printed on a document that identifies the custodian(s) of the original document and restrictions on further copying that apply to the custodian(s) and to the original document. Other information may also be included in the tracing information that serves to more uniquely identify the original. The required copy evidence is applied to the printed document through the use of fragile watermarks or robust watermarks. The required tracing information is applied to the printed document through the use of robust watermarks. The parameters of the selected trusted printer are set by a print management system to print the watermark(s), including the copy evidence and/or tracing information, appropriate to the required level of protection.

These and other features of the invention will be described in or are apparent from the following detailed description of various exemplary embodiments of systems and methods according to this invention.

BRIEF DESCRIPTION OF THE DRAWINGS

Various exemplary embodiments of systems and methods according to this invention will be described with reference to the following drawings, wherein.

DETAILED DESCRIPTION OF PREFERRED EMBODIMENTS

Figure 1:
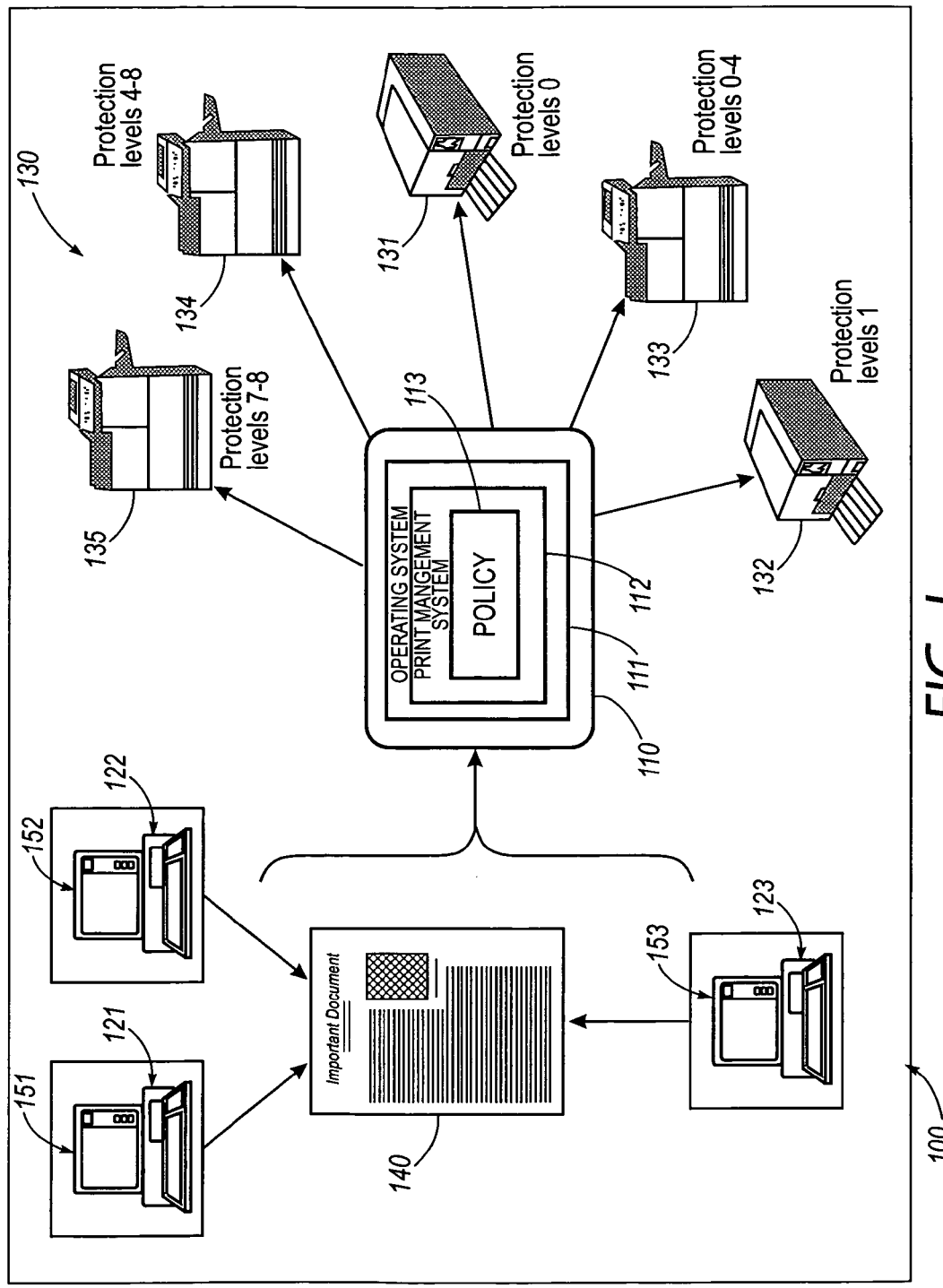
FIG. 1 is a schematic diagram illustrating a print management system according to this invention.

FIG. 1 is a schematic diagram illustrating a system for policy based printing. A network 100 includes at least one server 110 that controls a plurality of computers 121, 122 and 23. The server 110 also controls a family 130 of trusted printers 131–135. A trusted printer is a printer that is available only to authorized users of the network 100. The server 110 includes an operating system 111 that allows users of the network 100 to use various applications stored in the server 110 on the computers 121, 122 and 123. The applications may include, for example, word processing applications, spreadsheet applications, image scanning and/or processing applications, and/or database management applications. Authorized users of the computers 121, 122 and 23 can use the applications stored in the server 110 and controlled by the operating system 111 to create documents 140. The applications process images of the document 140 that can be viewed on the display units 151, 152 and 153 of the respective computers 121, 122 and 123.

The document 140 can be printed by entering a print command into one of the computers 121 or 122 or 123 and sending a print job to the server 110. The operating system 111 includes a print management system 112 that selects one of the family 130 of the trusted printers 131–135 that can provide a required level of protection for the document 140 to be printed. The print management system 112 includes a policy 113 that maps the document protection requirements to the specific security protection techniques available from the family 130 of the trusted printers 131–135.

The policy 113 determines the required protection level for the document 140 to be printed by collecting information about the value of the document 140 from the document creator or owner or from any other person authorized to print the document 140. The information may include assumptions about potential forgery and the cost necessary to provide a level of protection to detect and/or deter the potential forgery. The user may enter the information about the document 140 through a graphical user interface provided on one of the display units 151–153 of the particular computers 121–123 being used to print the document 140.

The print management system 112 may also allow the users to question each of the trusted printers 131–135 to determine what protection level each trusted printer 131–135 provides. The print management system 112 may also provide information to the user about which forgery techniques each protection level is able to detect and/or deter and the costs of using each protection level. Each computer 121–123 may be controlled by the print management system 112 and/or the operating system 111 to display to users the protection levels that may be applied to the document 140 to be printed.

Each document 140 to be printed may also have a security level embedded in it, attached to it or otherwise associated with it, that the print management system 112 can use to identify the specific combination of protection techniques needed to detect and/or deter potential forgery. The policy 113 is programmable and may be adapted to the particular requirements of the organization that operates, owns or uses the network 100. The policy 113 may be programmed to assign a protection level or levels for every authorized user of the network 100 or for every computer 121–123 of the network 100.

Every user of the network 100 may have an identification that is programmed into the policy 113. The identification may be a login password or user identification. Every document 140 printed by the user identified by the identification may have be assigned a specified protection level, a minimum protection level and/or a maximum protection level.

Every computer 121–123 of the network 100 may have an identification value. The computer identification values may be programmed into the policy 113. Every print job sent by the identified one of the computers 121–123 to the server 110 may have a specified protection level, a minimum protection level and/or a maximum protection level. The policy 113 determines the protection requirements for the document 140 to be printed by identifying the user that enters the print command and/or the computer 121–123 that sends the print job.

The policy 113 may also conduct a search of the content of the document 140 to determine the required protection level. The search could be, for example, a keyword search or a keyphrase search of the document 40. The protection requirements of the document 140 could be dependent on the number of occurrences of various ones of the keywords or keyphrases.

The policy 113 determines the security requirements for the document 140 to be printed. For example, the policy 113 may determine that the document 140 to be printed requires protection against forgery by copying using a standard photocopier. Alternatively, the policy 113 may determine that the document 40 to be printed requires protection against scanning, image processing, and alteration of the contents of the document 140. Once the policy 113 determines the security requirements, the print management system 112 identifies the specific combination of protection techniques needed to meet these requirements. The print management system 112 then routes the print job to one of the trusted printers 131–135 that can apply the appropriate protections and sets the parameters in the selected printer to apply the appropriate protection techniques to the document 140. Examples of the protection levels that can be applied to the document 140 when it is printed, the forgery techniques that the protection levels protect against and the equipment necessary for creating the protection level and verifying the authenticity of a document are described in Table 1.

TABLE 1

| Protection Levels | Technique(s) | Protects Against | Equipment Needed |
|---|---|---|---|
| Level 0 | Fragile variable copy evident watermark. | Adversary with standard copier and toner or ink. Blank originals attack. | Standard color printer, or special toner or ink, or hyperacuity printer with inspector. |
| Level 1 | Robust variable invisible copy evident watermark with tracing information. | Adversary who can remove copy evident watermarks from originals. Blank originals attack. Compromised tracing attack. | Standard color printer with special toner or ink. |
| Level 2 | Fragile variable fluorescing invisible copy evident watermark to print page offset, with tracing information. | Weak protection against tampering. Blank originals attack. | Special toner or ink and standard highlight or color printer. Enhancements could include toner sensor or sensor to verify the presence of the copy-evident watermark. Fluorescent light to verify. |

TABLE 1-continued

| Protection Levels | Technique(s) | Protects Against | Equipment Needed |
|---|---|---|---|
| Level 3 | Fragile variable fluorescing invisible copy evident watermark to print page offset, with tracing information, digitally signed and glyph encoded. | Adversary who can scan, image process, and print and who has access to the special toner or ink. | Special toner or ink and standard highlight or color printer. Enhancements could include toner sensor or sensor to verify the presence of the copy evident watermark. Fluorescent light and fluorescent scanner to verify. |
| Level 4 | Fragile variable fluorescing invisible copy evident watermark to print random portions of the page, with tracing information, digitally signed and glyph encoded. | Adversary who can scan, image process, and print and who has the special toner or ink. | Special toner or ink and standard highlight or color printer. Enhancements could include toner sensor or sensors to verify the presence of the copy evident watermark. Fluorescent light and fluorescent scanner to verify. |
| Level 5 | Robust variable fluorescing black copy evident watermark with tracing information. | Adversary with standard standard copier and toner or ink. Compromised tracing attack. | Fluorescing black toner or ink in a standard highlight or color printer. Fluorescent light to verify. |
| Level 6 | Robust variable fluorescing black copy evident watermark with tracing information to print fixed portions of the page. | Adversary with standard copier and tone or ink. Detached toner attack. Blank originals attack. | Fluorescing black toner or ink in a standard highlight or color printer. Fluorescent light to verify. |
| Level 7 | Robust variable fluorescing black copy evident watermark to print random portions of the page, with the random pattern specification encrypted and glyph encoded | Adversary with standard copier and toner or ink. Adversary with a scanner and image processor. Detached toner attack. Compromised tracing attack. | Fluorescing black toner or ink in a standard highlight or color printer. Fluorescent light to verify. Inspector to read and verify the glyph. |
| Level 8 | Robust variable fluorescing black copy evident watermark to print content dependent portions of the page, with tracing information, encrypted and glyph encoded | Adversary who alters tracing information. Adversary with standard copier and ink. Adversary who can scan and image process. Detached toner or ink attack. Compromised tracing attack. | Fluorescing black toner in a standard highlight or color printer. Fluorescent light to verify. Inspector to read and verify the glyph. |

Although Table 1 shows various watermarking techniques usable either alone or in combination to provide a specified level of protection to a document, it should be appreciated that the table is merely one exemplary embodiment of a policy 113. Other combinations of watermarking techniques may be provided to enable a greater range of protection levels. The protection levels, the techniques, the forgery methods that are protected against, and the equipment necessary to apply the techniques to a document to be printed and verify if a printed document is an original or a forgery are described in U.S. application Ser. No. 09/722,362, incorporated herein by reference in its entirety.

As shown in FIG. 1, the trusted printer 131 can print documents having Level 0 protection, the trusted printer 132 can print documents requiring Level 1 protection, the trusted printer 133 can print documents requiring Level 0 through Level 4 protection, the trusted printer 134 can print documents requiring Level 4 through Level 8 protection and the trusted printer 135 can print documents requiring Level 7 and Level 8 protection.

Figure 2:
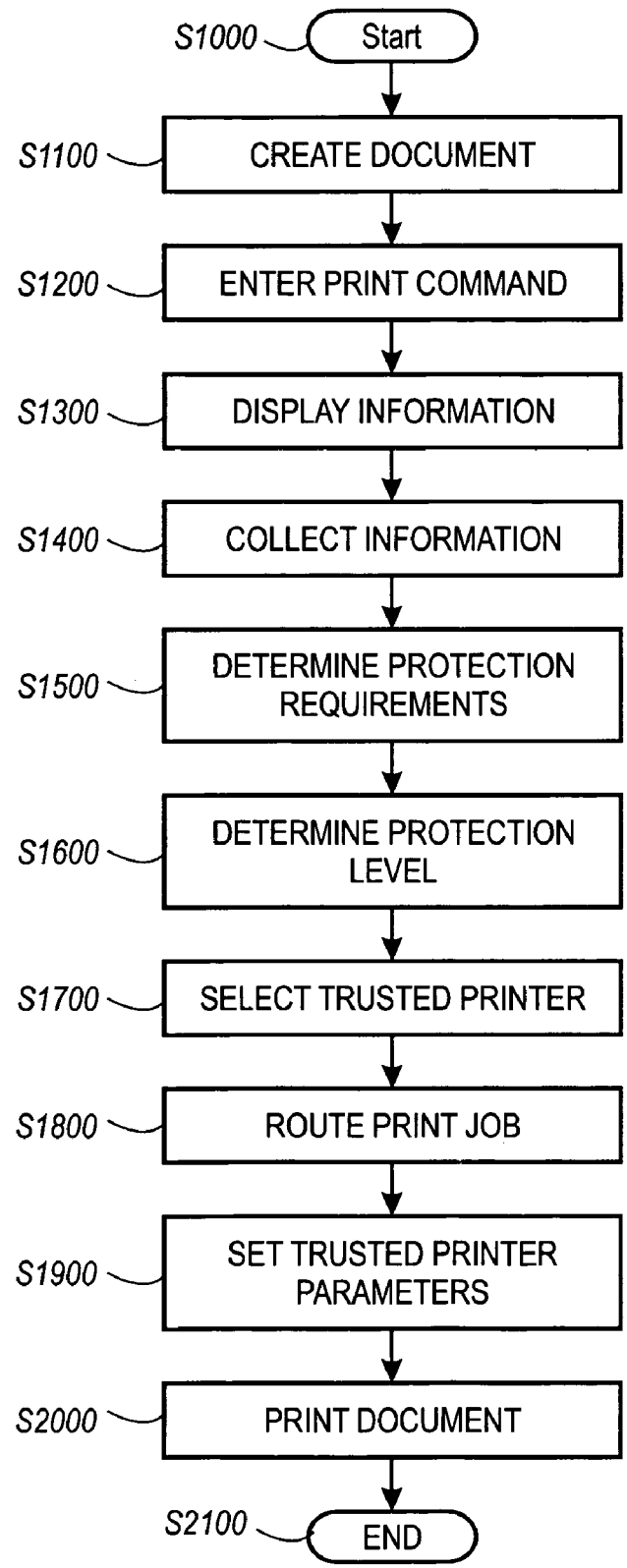
FIG. 2 is a flowchart of a document forgery protection printing method according to an exemplary embodiment of this invention.

FIG. 2 is a flowchart of one exemplary embodiment of a document forgery protection printing method according to this invention. Beginning in step S1000, control continues to step S1100, where a user creates a document that requires forgery protection. Then, in step S1200, the user enters a print command to print the document requiring forgery protection. Next, in Step S1300, information about the protection levels is displayed to the user. Control then continues to step S1400.

In Step S1400, information is collected about the value of the document requiring forgery protection. The information may include information or assumptions about potential forgery of the document requiring forgery protection and the cost of applying the various available protection techniques to the document requiring forgery protection. Next, in step S1500, the protection requirements of the document requiring forgery protection are determined based on a trusted printing policy. The determined protection requirements for the document requiring forgery protection may indicate that this document requires protection against forgery from copying using a standard photocopier or that the document requiring forgery protection requires protection against forgery by scanning, image processing and altering of the contents of the document. Then, in step S1600, the protection level that provides the specific combination of protection techniques to meet the determined protection requirements is determined. Control then continues to step S1700.

In step S1700, a trusted printer that can apply the appropriate protection techniques to the document requiring forgery protection is selected based on the determined protection level. Then, in step S1800, the print job for the document requiring forgery protection is routed to the selected trusted printer. Next, in step S1900, the parameters in the selected trusted printer are set based on the determined protection level. In step S2000, the document requiring forgery protection, including the protection techniques of the determined protection level, is printed using the selected trusted printer. Then in step S2100 the method ends.

Although one exemplary embodiment of a document forgery protection printing method according to this invention has been described above with respect to FIG. 2, it should be appreciated that other exemplary embodiments of document forgery protection printing methods may be apparent to those of ordinary skill in the art. For example, in various exemplary embodiments of the document forgery protection printing method according to this invention, the information about the protection levels may be displayed prior to the print command being entered. In other various exemplary embodiments of the document forgery protection printing method invention of this invention, the information about the value of the document and the potential forgery of the document may also be collected prior to the print command being entered. In other various exemplary embodiments of the document forgery protection printing method according of this invention, the parameters of the selected trusted printer may be set prior to the print job being routed to the selected trusted printer.

While this invention has been described in conjunction with the various exemplary embodiments outlined above, it is evident that many alternatives, modifications and variations will be apparent to those skilled in the art. Accordingly, the various exemplary embodiments of the invention, as set forth above, are intended to be illustrative, not limiting. Various changes may be made without departing from the spirit and scope of the invention.

What is claimed is:

1. A document forgery protection printing method, comprising:
   processing an image of a document;
   determining forgery protection requirements for the document to be printed using a print management system and a computerized policy stored on a computer device to collect information about the document and to use the collected information in determining forgery protection requirements;
   determining a protection level to be applied to the document based on the determined forgery protection requirements;
   selecting a printer from a plurality of printers that can print the document; and
   based on the determined protection level, printing at least one watermark on the document that corresponds to the determined protection level using the selected printer, wherein determining the forgery protection requirements includes displaying information about forgery techniques and using the displayed information in determining the forgery protection requirements to be applied to the document.

2. The method of claim 1, wherein displaying information further includes displaying information about forgery techniques each protection level is able to at least one of detect and deter and information about costs of using each protection level.

3. The method of claim 1, wherein determining the protection level includes identifying at least one of a creator of the document, a person entering a command to print the document, and an image processor that processes the image of the document, and using the at least one identification in determining forgery protection requirements.

4. The method of claim 1, wherein determining the protection level includes searching and reviewing contents of the document and using the contents of the document in determining forgery protection requirements.

5. The method of claim 1, further comprising querying the plurality of printers to determine the protection level each printer can apply to the document and using one of the printers with a specific combination of protection techniques.

6. The method of claim 1, further comprising setting printing parameters on the selected printer to apply the determined protection level to the document based on the policy.

7. The method of claim 1, wherein determining the protection level includes at least one of assigning and selecting the protection level by at least one of a creator of the document, a person entering a command to print the document, and the policy.

8. A document forgery protection printing system, comprising:
   at least one server having a print management system and storing a policy that determines forgery protection requirements and a forgery protection level for the document;
   at least one image processor that processes an image of the document;
   a display device, the at least one server and the at least one image processor driving the display device to display information about forgery techniques and using the displayed information in determining forgery protection requirements for the document;
   a plurality of printers, each printer able to print the document and able to apply at least one protection level to the document by printing at least one watermark on the document that corresponds to the determined protection level, wherein the policy collects information about the document and determines the protection level for the document based on information collected.

9. The document forgery protection printing system of claim 8, wherein the displayed information includes information about forgery techniques each protection level is able to at least one of detect and deter and information about costs of using each protection level.

10. The document forgery protection printing system of claim 8, wherein the policy searches content of document and determines the protection level based on at least one of a creator of the document, a person entering a command to print the document, and an image processor that processes the image of the document.

11. The document forgery protection printing system of claim 8, wherein the policy determines the protection level based on at least one of a keyword and key phrase search from contents of the document.

12. The document forgery protection printing system of claim 8, wherein the policy determines the protection level based at least in part on a forgery protection requirements and a protection level assigned to the document.

13. The document forgery protection printing system of claim 8, wherein the server sets printing parameters for the selected printer selected to apply the determined protection level to the document based on the policy.

* * * * *